US009251177B2

(12) United States Patent
Ennis et al.

(10) Patent No.: US 9,251,177 B2
(45) Date of Patent: Feb. 2, 2016

(54) INFORMATION REMOVAL FROM A NETWORK

(75) Inventors: Patrick John Ennis, Bellevue, WA (US); Alexander Knight, Seattle, WA (US); Vlad Grigore Dabija, Mountain View, CA (US); Timothy Martin Londergan, Seattle, WA (US); David Walter Ash, Bellevue, WA (US); Dominic Dan Suciu, Edmonds, WA (US); Raghuram Madabushi, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 154 days.

(21) Appl. No.: 13/701,197

(22) PCT Filed: Jun. 12, 2012

(86) PCT No.: PCT/US2012/042044
§ 371 (c)(1),
(2), (4) Date: Nov. 30, 2012

(87) PCT Pub. No.: WO2013/187882
PCT Pub. Date: Dec. 19, 2013

(65) Prior Publication Data
US 2013/0332485 A1    Dec. 12, 2013

(51) Int. Cl.
*G06F 17/30*      (2006.01)
*G06Q 10/10*      (2012.01)
*G06Q 50/00*      (2012.01)

(52) U.S. Cl.
CPC .......... *G06F 17/30283* (2013.01); *G06Q 10/10* (2013.01); *G06Q 50/01* (2013.01)

(58) Field of Classification Search
CPC .................. G06F 17/30542; G06F 17/30283
USPC .................................................. 707/770, 780
See application file for complete search history.

(56) References Cited

U.S. PATENT DOCUMENTS 5,715,443 A    2/1998    Yanagihara et al.
7,966,325 B2   6/2011    Singh
(Continued)

OTHER PUBLICATIONS

Mau et al. (U.S. Appl. No. 61/594,948), Feb. 3, 2012, Specification pp. 1-11.*

(Continued)

*Primary Examiner* — Rehana Perveen
*Assistant Examiner* — Alexander Khong
(74) *Attorney, Agent, or Firm* — Moritt Hock & Hamroff LLP; Steven S. Rubin, Esq.

(57) ABSTRACT

Technologies are generally described for systems, methods and devices effective to remove information from a network such as the Internet. In some examples, a device may include a memory including instructions and a processor configured in communication with the memory. The processor may be configured effective to receive user information relating to a user and search the network using the user information. In response to the search, the processor may find additional information relating to the user stored in the network. The processor may receive a first request to remove particular information from the network. The particular information may be part of the additional information and the particular information may be removable by a second user. The processor may send a second request to remove the particular information from the network.

20 Claims, 6 Drawing Sheets

(56) References Cited

U.S. PATENT DOCUMENTS

| | | | |
|---|---|---|---|
| 8,090,666 | B2 | 1/2012 | Sarbaev et al. |
| 8,150,844 | B2 | 4/2012 | Redstone et al. |
| 8,185,558 | B1* | 5/2012 | Narayanan et al. ............ 707/798 |
| 2007/0071323 | A1 | 3/2007 | Kontsevich et al. |
| 2008/0270038 | A1 | 10/2008 | Partovi et al. |
| 2009/0006388 | A1 | 1/2009 | Ives et al. |
| 2009/0106822 | A1 | 4/2009 | Obasanjo et al. |
| 2010/0082684 | A1 | 4/2010 | Churchill et al. |
| 2011/0202968 | A1 | 8/2011 | Nurmi |
| 2012/0011202 | A1 | 1/2012 | Occhino et al. |
| 2012/0066262 | A1 | 3/2012 | Greenberg |
| 2012/0084655 | A1 | 4/2012 | Gallagher et al. |
| 2012/0096038 | A1 | 4/2012 | Sittig et al. |
| 2012/0117144 | A1* | 5/2012 | Douillet et al. .............. 709/203 |
| 2012/0203708 | A1* | 8/2012 | Psota et al. .................... 705/347 |
| 2012/0250951 | A1* | 10/2012 | Chen .............................. 382/118 |
| 2013/0073995 | A1* | 3/2013 | Piantino et al. ............... 715/764 |
| 2013/0290050 | A1* | 10/2013 | Gross et al. .................. 705/7.13 |

OTHER PUBLICATIONS

Vanessa Fox (NPL, "How to Remove Your Personal Information From Google"), Search Engine Land, Nov. 8, 2010, pp. 2-5.*
J. Cheng, "Deleted" Facebook photos still not deleted: a followup, retrieved from arstechnica.com/web/news/2010/10/facebook-may-be-making-strides.ars, 2010, 1 page.
S. O'Hear, The Social Web: How to permanently delete your Facebook account, ZDNet, Feb. 11, 2008, 9 pages.
Michael Devine, Exfoliate for Facebook—Andoroid Apps on Google Play, https://play.google.com/store/apps/details?id=com.worb.android.exfoliate on Apr. 5, 2012, 3 pages.
Saurabh Mishra, New Application to Delete Drunken Messages on Social Platforms, retrieved from http://informationmadness.com on Apr. 5, 2012, 3 pages.
Zack Whittaker, London Calling—How to delete every Facebook wall post, wipe your Timeline, Jan. 2, 2012, 12 pages.
International Search Report and Written Opinion for application with application No. PCT/US2012/042044, dated Sep. 13, 2012, 18 pages.

* cited by examiner

INFORMATION REMOVAL FROM A NETWORK

CROSS-REFERENCE TO RELATED APPLICATION

This application is a U.S. application filing under 35 U.S.C. §371 of PCT Application No. PCT/US12/42044 filed on Jun. 12, 2012, the entirety of which is hereby incorporated by reference.

BACKGROUND

Unless otherwise indicated herein, the materials described in this section are not prior art to the claims in this application and are not admitted to be prior art by inclusion in this section.

A network such as the Internet is a collection of computers and/or processors connected to be in communication. A social network on the Internet may allow a user to post information about the user so that others in the user's social network may view the information by communication through the Internet. Information about the user may include pictures, videos, text, commentaries, etc.

SUMMARY

In an example, a method for removing information from a network is generally described. The method may include, by a processor, receiving user information relating to a first user. The method may further include searching the network using the user information. The method may include, in response to searching, finding additional information relating to the first user stored in the network. The method may include receiving a first request to remove particular information from the network. The particular information may be part of the additional information and the particular information may be removable by a second user. The method may include sending a second request to remove the particular information from the network.

In an example, a device effective to remove information from a network is generally described. The device may include a memory including instructions and a processor configured in communication with the memory. The processor may be configured effective to receive user information relating to a user. The processor may be configured effective to search the network using the user information. The processor may be configured effective to, in response to the search, find additional information relating to the user stored in the network. The processor may be configured effective to receive a first request to remove particular information from the network. The particular information may be part of the additional information and the particular information may be removable by a second user. The processor may be configured effective to send a second request to remove the particular information from the network.

In an example, a system effective to remove information from the Internet is generally described. The system may include a first memory including instructions, a removal processor configured in communication with the first memory and a social network processor configured in communication with the removal processor over the Internet. The removal processor may be configured effective to receive user information relating to a user. The removal processor may be configured effective to search the social network processor using the user information. The removal processor may be configured effective to, in response to the search, find additional information relating to the user. The removal processor may be configured effective to receive a first request to remove particular information from the Internet. The particular information may be part of the additional information and the particular information may be removable by a second user. The removal processor may be configured effective to send a second request to remove the particular information from the Internet.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
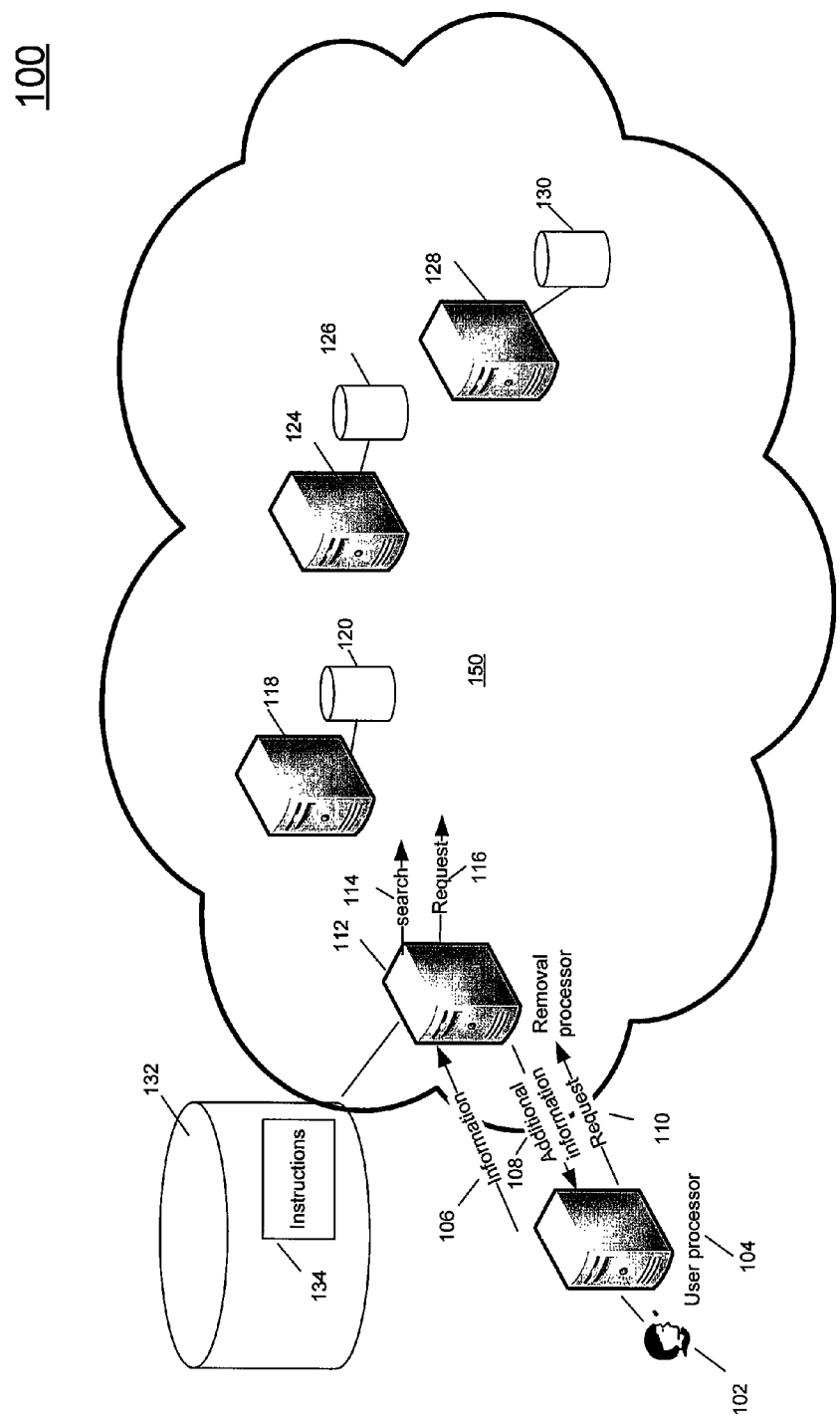
FIG. 1 illustrates some example systems that can be utilized to implement information removal from a network.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to information removal from a network.

Briefly stated, technologies are generally described for systems, methods and devices effective to remove information from a network such as the Internet. In some examples, a device may include a memory including instructions and a processor configured in communication with the memory. The processor may be configured effective to receive user information relating to a user and search the network using the user information. In response to the search, the processor may find additional information relating to the user stored in the network. The processor may receive a first request to remove particular information from the network. The particular information may be part of the additional information and the particular information may be removable by a second user. The processor may send a second request to remove the particular information from the network.

FIG. 1 illustrates some example systems that can be utilized to implement information removal from a network. In some examples, as explained in more detail below, a system 100 may include a user processor 104, and/or a removal processor 112 configured to be in communication through a network 150 such as the Internet. Network 150 may include other processors 118, 124, 128 configured to be in communication with respective memories 120, 126, 130. Removal processor 112 may be configured to operate in accordance with instructions 134 in a memory 132 configured to be in communication with removal processor 112. A user 102 may send information 106 relating to user 102. Removal processor 112 may receive information 106 and generate a search 114 of network 150 to find additional information relating to user 102 based on information 106. In response to search 114, removal processor 112 may find additional information 108 and send additional information 108 to user processor 104. User 102 may then use user processor 104 to generate a request 110 to remove some of additional information 108 from network 150. Removal processor 112 may receive request 110 to remove particular information of the additional information and generate a request 116 to remove the selected information from the network.

Figure 2:
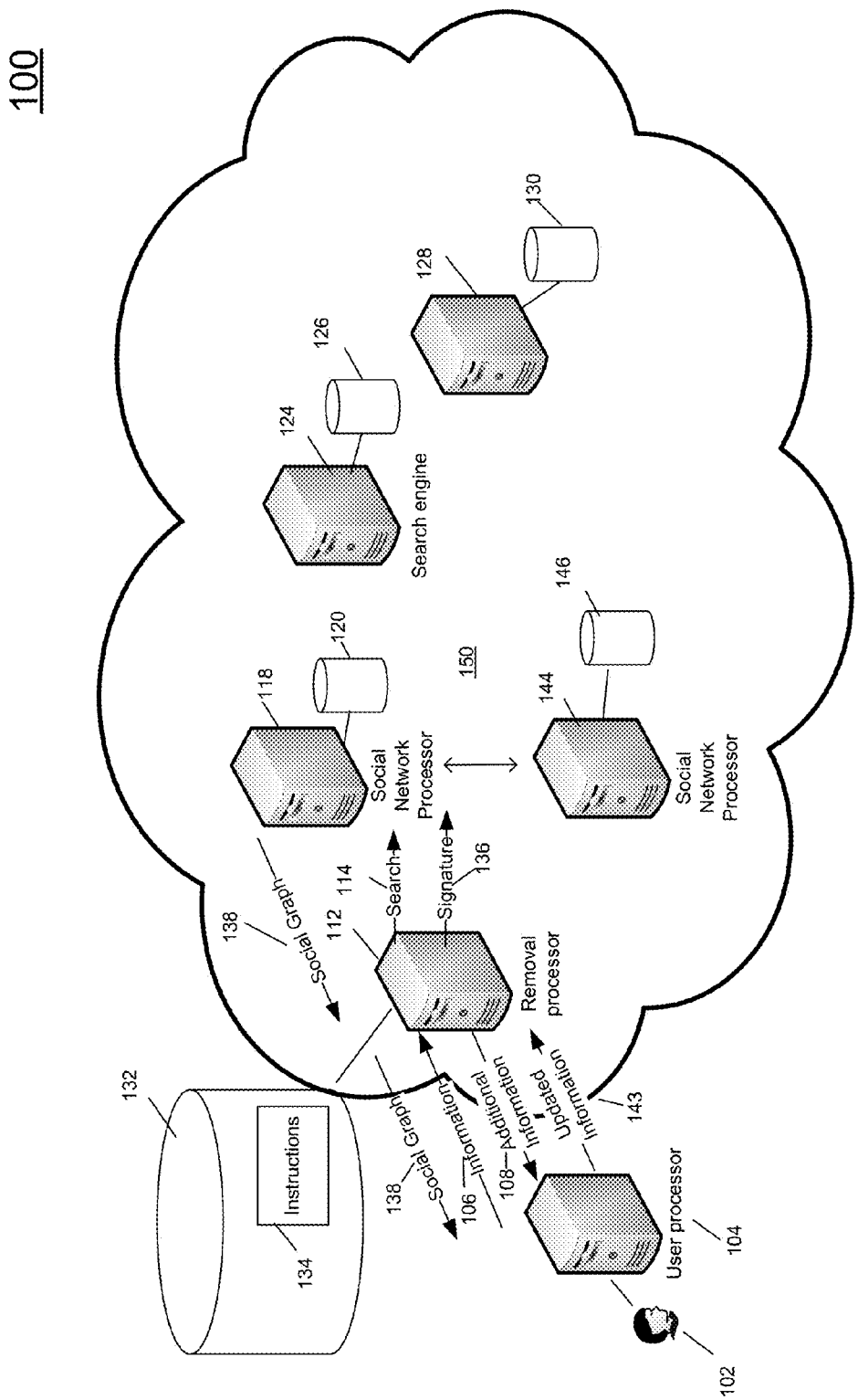
FIG. 2 illustrates some example systems that can be utilized to implement information removal from a network.

FIG. 2 illustrates some example systems that can be utilized to implement information removal from a network arranged according to at least some embodiments described herein. Those components in FIG. 2 that are labeled identically to components of FIG. 1 will not be described again for the purposes of clarity.

Removal processor 112 may provide a standalone service that may operate independently of other processors 118, 124, 128. Removal processor 112 may operate in conjunction with and/or be a service provided by, one or more processors 118, 124, 128, 144. Removal processor 112 may be adapted to access multiple processors, may be focused on a particular processor, or may be effective to operate on many or all processors in network 150. Processor 118 may be a social network processor. Processor 124 may be a search engine processor. User processor 104 may request that removal processor 112 process information 106 periodically, perhaps once a month.

User information 106 may provide sufficient information for removal processor 112 to search network 150 and find additional information 108. User information 106 may identify to removal processor 122 where removal processor 122 should crawl in network 150. For example, user information 106 may include a user's name, user identification with one or more social networks such as FACEBOOK, TWITTER, LINKEDIN, TUMBLR etc., age, gender, job status, sexual orientation, ethnicity, location, one or more images, audio clip, video clip, social security number, credit card or bank account information passwords, residence, occupation, nationality, whether the user owns or rents or lives with parents, personal assets, other user identifications, biometric or other sensor data, etc.

In some examples, user information 106 may effectively be a request relating to removal of particular information. For example, user information 106 may include photographs at a particular location or that were taken at a defined specified time interval (e.g. in March 2012 or Fall 2011). Such user information may effectively be a request that these and related photographs around the specified time interval be removed from the Internet. Removal processor 112 may then search network 150 for additional information 108 including photographs taken during the defined period of time and/or with geographic tags around the particular location. For example, photographs posted to a social network processor 118 may include embedded geotag information that may be searched by removal processor 112.

Removal processor 112 may receive and process user information 106 to produce a signature 136 relating to user 102. As multiple pieces of information 106 may be received from user 102, signature 136 may help distinguish user 102 from other users who share some information with user 102. In examples where removal processor 112 received confidential or sensitive information, instructions 134 may help ensure that the confidential information is maintained in a confidential and/or blind way.

Removal processor 112 may be adapted to search network 150 using signature 136. Removal processor 112 may have access to information in memory 120 of social network processor 118. For example, removal processor 112 may be controlled by, or have a relationship with, social network processor 118. For example, removal processor 112 may be operated by an insurance company who may have negotiated a proprietary way of accessing information in memory 120 of social network processor 118. Removal processor 112 may operate in accordance with an API (application programming interface) made available by social network processor 118.

As user information 106 may include a user identification and password for user 102 at social network processor 118, removal processor 112 may log in or otherwise obtain access to social network processor 118 acting on behalf of as user 102. Removal processor 112 may obtain a social graph 138 relating to user 102 at one or more social network processors 118. Social graph 138 may indicate one or more nodes connected to user 102 in a social network such as through TUMBLR, LINKEDIN, FACEBOOK, etc. Removal processor 112 may interpret social graph 138 to identify locations and/or nodes where removal processor 112 may find more information relating to user 102—such as nodes within a threshold number of hops from user 102 in social graph 138. Removal processor 112 may send social graph 138 to user processor 104 and receive updated information 143 in response. Updated information 143 may indicate nodes in social graph 138 where removal processor 112 should look for more information relating to user 102. For example, user 102 may prune social graph 138 and identify particular nodes that are more likely to have information that user 102 would like removed from the Internet.

Using user information 106, removal processor 112 can find information from social network processor 118 or other processors that may not be index-able by a search engine. Similarly, a search engine may employ removal processor 112 as a service offered by the search engine. Removal processor 112 may be adapted to scrape screens available from social network processor 118.

Removal processor 112 may search social network processor 118, search engine processor 124 and/or other processors 128 using signature 136 to find additional information 108 relating to user 102. For example, removal processor 112 may search network 150 for images or photographs that correspond to images provided in information 106 using image recognition software. Removal processor 112 may search for images with tags or other information corresponding to information 106 of user 102. For example, images in memory 120 may have captions or other tags corresponding to user information 106.

Social network processor 118 may be linked to another social network processor 144 configured in communication with a memory 146. For example, FACEBOOK may be linked with FOURSQUARE such that posts to one of the social network processors may be identified and posted by the other of the social network processors. Instructions 134 may include rules identifying when processors in network 150 are linked to one another. For example, instructions 134 may indicate that social network processor 144 is linked to social network processor 118. In examples where removal processor 112 identifies social network processor 118 as a processor to search for additional information relating to user 102, instructions 134 may control removal processor 112 to also search social network processor 144. If another password and user identification is required, removal processor 112 may request the password and user identification from user 102.

Removal processor 112 may order or rank additional information 108 based on how likely the additional information corresponds to user 102 or based on the sensitivity of the information. For example, additional information 108 relating to photographs corresponding to images in memory 106 may yield a large number of photographs depending on the sophistication of image recognition software. Removal processor 112 may rank additional information 108 based on where the information was found. For example, if additional information 108 is more than a threshold number of nodes away from user 102 in social graph 138, there may be less likelihood that the additional information corresponds to user 102. Conversely, if additional information 108 is less than a threshold number of nodes away from user 102 in social graph 138, there is a greater likelihood that the additional information corresponds to user 102.

Additional information that has a greater likelihood of embarrassment may be ranked higher. For example, results found in FACEBOOK may have a greater chance of embarrassment than results found in LINKEDIN. Additional information with a social security number and/or credit card number may be sensitive and may be ranked higher than other additional information.

Figure 3:
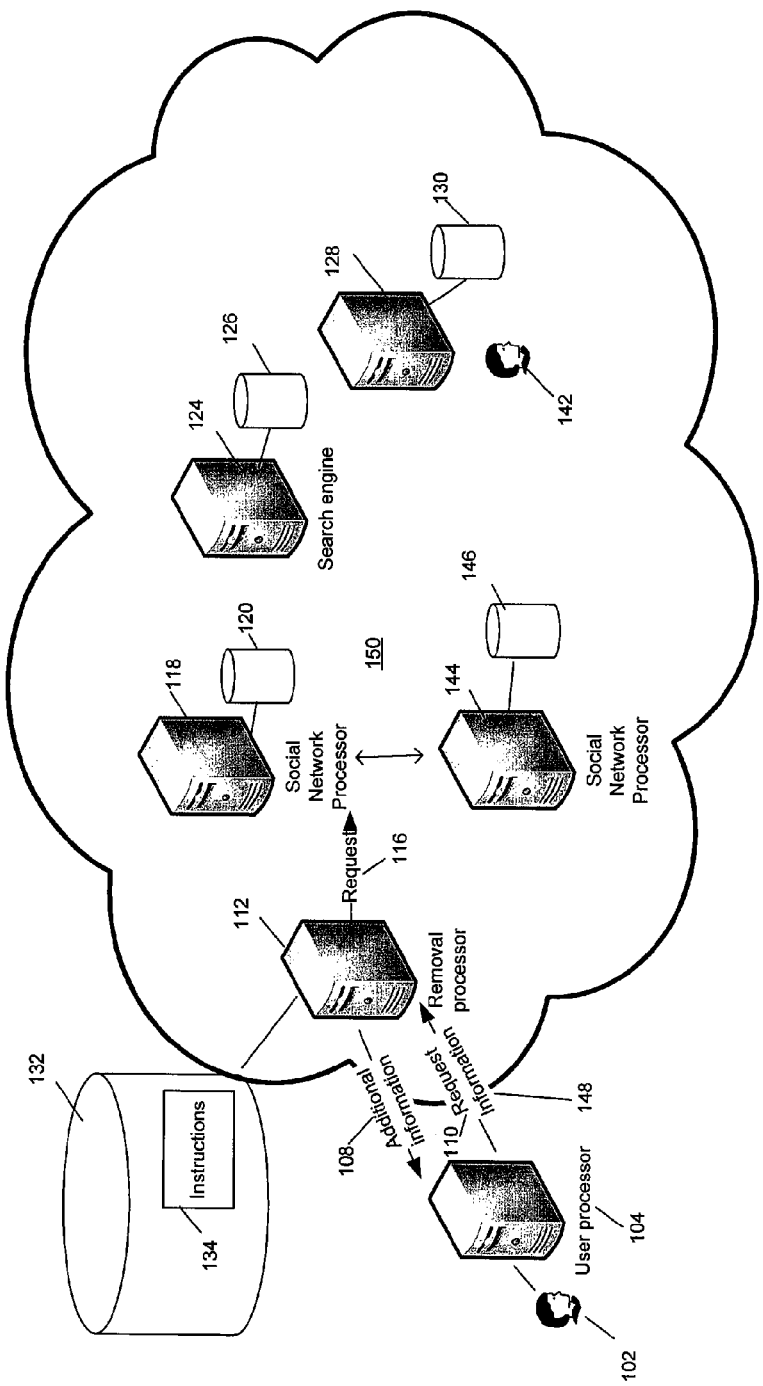
FIG. 3 illustrates some example systems that can be utilized to implement information removal from a network.

FIG. 3 illustrates some example systems that can be utilized to implement information removal from a network arranged according to at least some embodiments described herein. Those components in FIG. 3 that are labeled identically to components of FIGS. 1 and 2 will not be described again for the purposes of clarity.

As mentioned above, removal processor 112 may search network 150 and find additional information 108 in response. User processor 104 may generate request 110 requesting that particular information 148 be removed from network 150. Some information 148 may be removed by removal processor 112 automatically. For example, request 110 may request that photographs or images corresponding to user 102 be removed from network 150. To the extent the user 102 has control over information 148, such as when information 148 is in his/her social network, request 110 may indicate that information 148 be automatically removed. In this example, request 116 may be effective to delete information 148 from network 150.

In situations where particular information 148 cannot be deleted, such as when the particular information is removable by another user (e.g., user 102 does not have rights or permissions to remove the particular information), request 116 may request that information 148 be removed or obfuscated. For example, in an image of user 102 in a photograph including other people, or a video including user 102, request 116 may request that the image or video of user 102 be blurred or replaced with another image. In situations where information 148 is removable by another user 142, request 116 may include a request to remove or obfuscate information 148. For example, request 116 may include a modified photograph or video of user 102 where an image or video of user 102 has been blurred. Removal processor 112 may request that the modified photograph be used to replace an existing photograph. For example, removal processor 112 may act on behalf of user 102 to request deletion or obfuscation of information 148. Request 116 may include a request to remove information 148 under control by other user 142. Removal processor 112 may be adapted to periodically ask other user 142 if information 148 has been removed and to inform user 102 of communication with other user 142 relating to attempts to remove information 148.

Removal processor 112 may coordinate with user processor 104 to offer an incentive to other user 142 to remove information 148. For example, removal processor 112 may be adapted to coordinate transfer of funds from user 102 to other user 142 to remove information 148. In examples where information 148 is determined to be removed from a first processor, instructions 134 may indicate that the same information should be removed from a linked processor and request 116 may be sent to the linked processor.

After removal of information 148, information 148 may still show up in search results such as by search engine processor 124. Removal processor 112 may inform user processor as to approximately how long information 148 will show up in search results by search engine processor 124. Similarly, not all removals may have an immediate effective depending on refresh and caching characteristics of various processors. Removal processor 112 may inform user processor 104 as to approximately how long information may show up in search results. Removal processor 112 may also schedule additional follow up searches to determine the status of the removal. In an example, a user may wish to remove photographs relating to the user at a particular event such as what occurred at Lake X. The user may remove photographs relating to Lake X from the user's social network accounts but photographs may appear in other social network accounts and/or locations on the Internet. Friends may have posted photographs on TUMBLR, PINTEREST, etc. The user may send user information to the removal processor. The removal processor may generate a signature based on the user information. The removal processor may use the signature to search the Internet using the user's information and find additional information. The additional information may include photographs where the user was tagged or photographs where, based on image recognition, an image of the user appears. The user may request that these photographs be removed from the Internet. The user may request that photographs of the user under control of the another user be blurred. Photographs under control of the user may be deleted. In photographs which include the user and other people, the user's image may be blurred or otherwise obfuscated. For photographs under control of another user, a request may be made for those images to be removed from the Internet or obfuscated.

The request to remove may have an ability to override certain standard functionalities in the processors such as a social network processor. For example, a higher level remove request may allow a requesting user to remove information from a memory even if a user in control of the information does not approve. For example, certain users may be able to remove information from FACEBOOK pages controlled by another user even if the other user does not approve. Other middle level remove requests may require approval from the user in control of the information. Some removal requests may have associated automatic notification of compliance, logging of compliance data, etc.

In an example, a user may wish to leave FACEBOOK. The user may remove all photographs and tags that are accessible to the user. The user may also request that friends, and friends of friends, delete or blur photographs relating to the user. Friends may be given a copy of the proposed modified blurred photograph and asked to: 1) delete the original photograph 2) blur the original photograph in accordance with the proposed modified photograph 3) provide a different blurred photograph or 4) reject the request. If the request is rejected, the user may want to distance himself or herself from the rejecting user in FACEBOOK or post different photographs that do not resemble the photos desired to be removed.

In an example, a user may want to leave FACEBOOK. Natural language comments may exist on the social network relating to the user. The disclosed system may find these comments and present them to the user as additional information that may be removed from the Internet.

Among other possible benefits, a system in accordance with the disclosure may allow a user to remove undesired information from a network such as the Internet. A user may use the described system to enforce privacy laws such as removing photographs depicting the user. The user may use the system to remove display of the user's social security number. In an example, a user entering a witness protection program may have their information removed from the Internet. Items like surveillance photographs, grades, etc. may be removed from the Internet. A member of a social network who has been associated with the social network for a period of time may have information scattered in multiple places. Using the disclosed system, this member may be able to remove at least some of his/her information from the Internet. Embarrassing information on a social network may be removed. A user may also leave one social network and move to another. In an example, the removal processor may receive information relating to a list of people who had identity information stolen. The removal processor may remove the information from the Internet.

Figure 4:
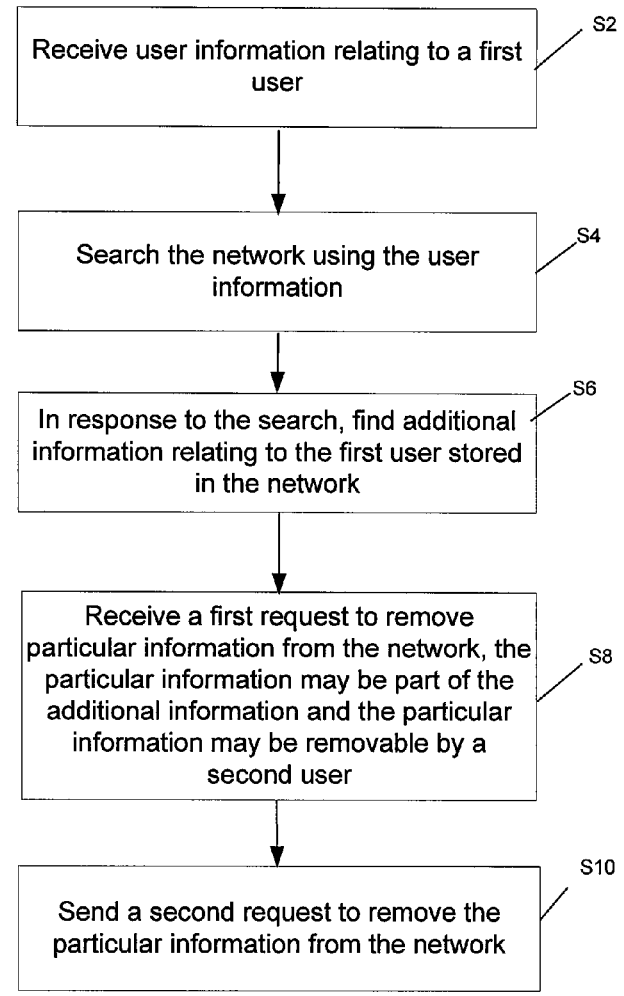
FIG. 4 depicts a flow diagram for example processes for implementing information removal from a network.

FIG. 4 depicts a flow diagram for example processes for implementing information removal from a network arranged in accordance with at least some embodiments described herein. The process in FIG. 4 could be implemented using, for example, system 100 discussed above. An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation.

Processing may begin at block S2, "Receive user information relating to a first user." At block S2, a processor may be configured effective to receive information relating to a first user. For example, the user information may include a user name or password for a user at a social network processor. The user information may include age, gender, job status, sexual orientation, ethnicity, location, one or more images, audio clip, video clip, social security number, credit card or bank account information, passwords, residence, occupation, nationality, whether the user owns or rents or lives with parents, personal assets, biometric or other sensor data, etc.

Processing may continue from block S2 to block S4, "Search the network using the user information." At block S4, the processor may search the network, such as the Internet, using the user information. For example, the processor may search a social network using the user information such as through use of an application programming interface. The processor may scrape a screen from a social network processor. The processor may log into the social network using the user information or otherwise use the user information to obtain access to the social network, obtain a social graph relating to the user and identify nodes connected to the user. The processor may search a first processor and then a second processor indicated as being linked to the first processor. The processor may use image recognition to identify images and photographs similar to an image of the user in the user information.

Processing may continue from block S4 to block S6, "In response to the search, find additional information relating to the first user stored in the network." At block S6, the processor may find additional information relating to the user. For example the additional information may be removable by a second user. The processor may rank the additional information based on a likelihood that the additional information corresponds to the first user.

Processing may continue from block S6 to block S8, "Receive a first request to remove particular information from the network, the particular information may be part of the additional information and the particular information may be removable by a second user." At block S8, the processor may receive a request to remove information that is removable or under control of a second user.

Processing may continue from block S10, "Send a second request to remove the particular information from the network." At block S10, the processor may be effective to send a request to remove the particular information from the network. For example the processor may send a request to obfuscate or blur images corresponding to the user. The processor may identify the additional information on a first processor and send a request to a second processor linked to the first processor to remove the additional information.

Figure 5:
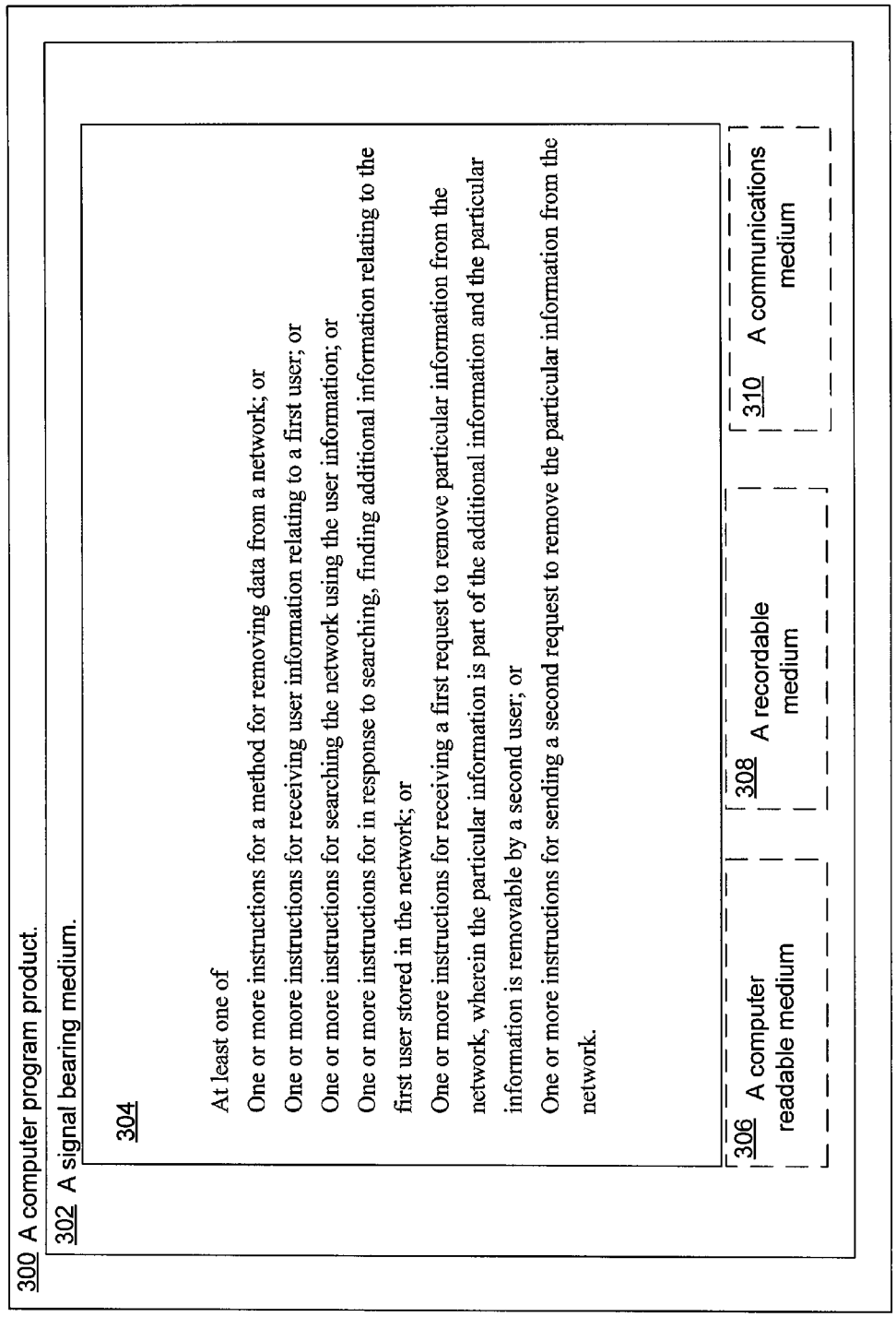
FIG. 5 illustrates computer program products for implementing information removal from a network.

FIG. 5 illustrates computer program products 300 for implementing information removal from a network arranged in accordance at least some embodiments described herein. Computer program product 300 may include a signal bearing medium 302. Signal bearing medium 302 may include one or more instructions 304 that, when executed by, for example, a processor, may provide the functionality described above with respect to FIGS. 1-4. Thus, for example, referring to system 100, removal processor 112 may undertake one or more of the blocks shown in FIG. 5 in response to instructions 304 conveyed to the system 100 by signal bearing medium 302.

In some implementations, signal bearing medium 302 may encompass a computer readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 6:
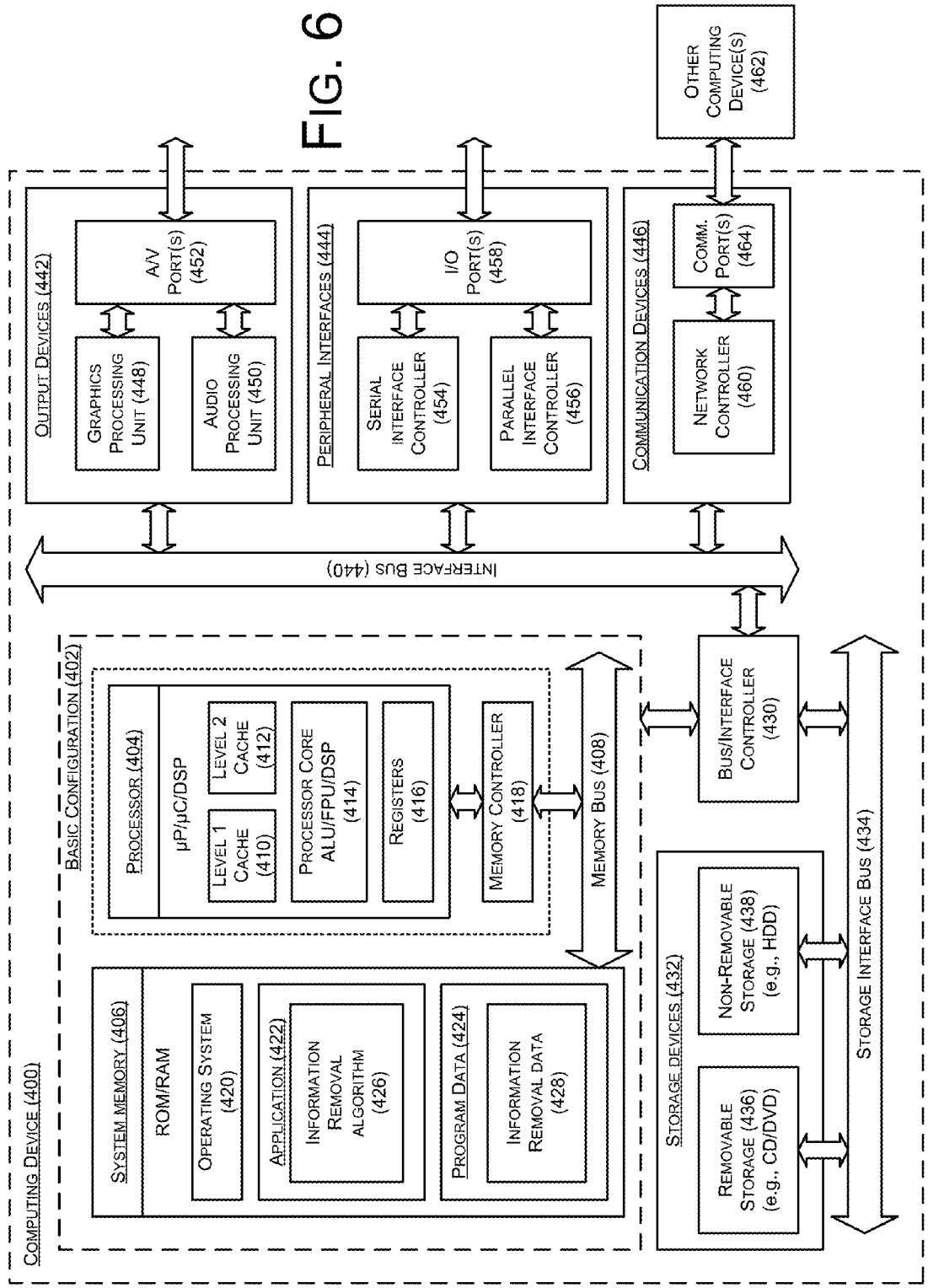
FIG. 6 is a block diagram illustrating an example computing device that is arranged to implement information removal from a network.

FIG. 6 is a block diagram illustrating an example computing device 400 that is arranged to implement information removal from a network arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include an information removal algorithm 426 that is arranged to perform the functions as described herein including those described previously with respect to FIGS. 1-5. Program data 424 may include information removal data 428 that may be useful for implementing information removal from a network as is described herein. In some embodiments, application 422 may be arranged to operate with program data 424 on operating system 420 such that information removal from a network may be provided. This described basic configuration 402 is illustrated in FIG. 6 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to remove information from a social network, the method comprising, by a processor:
   receiving user information relating to a first user;
   searching the social network using the user information to find additional information stored in the social network relating to the first user, wherein the additional information is different from the user information, and the additional information is inaccessible by the first user;
   receiving a first request to remove particular information from the social network, wherein the particular information is part of the additional information found on the social network and inaccessible by the first user, the particular information is removable by a second user, and the first user does not have rights to remove the particular information from the social network;
   sending a second request through the social network to remove the particular information from the network to the second user, wherein the second user has the rights to remove the particular information from the social network and the second request includes a proposed modified blurred photograph or video of the first user with an image or video of the first user blurred;
   requesting the second user to replace the particular information with the proposed modified blurred photograph or video; and
   informing the first user when the second user refuses to remove the particular information.

2. The method of claim 1, wherein searching the social network includes searching a social network processor using the user information.

3. The method of claim 1, wherein:
   the additional information includes a photograph of the first user.

4. The method of claim 1, wherein searching the social network includes using an application programming interface provided by a social network processor.

5. The method of claim 1, wherein searching the social network includes scraping a screen from a social network processor.

6. The method of claim 1, wherein searching the social network includes:
   searching a first processor using the user information;
   determining that the first processor is linked to a second processor; and
   searching the second processor using the user information.

7. The method of claim 1, wherein searching the social network includes:
   searching a first social network processor using the user information;
   determining that the first social network processor is linked to a second social network processor; and
   searching the second social network processor using the user information.

8. The method of claim 1, further comprising ranking the additional information based on a likelihood that the additional information corresponds to the first user.

9. The method of claim 1, further comprising ranking the additional information based on a sensitivity of the additional information.

10. The method of claim 1, further comprising ranking the additional information based on where the additional information was found on the social network.

11. The method of claim 1, wherein:
the additional information is stored in a memory that is a number of nodes away from the first user in a social graph; and
the method further comprises ranking the additional information based on the number of nodes.

12. The method of claim 1, wherein the user information includes at least one of a user's name, user identification with one or more social networks, age, ethnicity, a location of the user, an image of the user, an audio clip, a video clip, social security number, credit card number or bank account information, password, gender, job status, sexual orientation, residence, occupation, biometric or other sensor data, and/or nationality.

13. The method of claim 1, wherein the user information includes a particular location.

14. The method of claim 1, wherein the user information includes a specified time interval.

15. The method of claim 1, wherein the second request to remove includes obfuscating the information.

16. The method of claim 1, wherein the second request to remove includes requesting removal in exchange for a fee.

17. A device effective to remove information from a social network, the device comprising:
a memory including instructions;
a processor configured in communication with the memory, the processor configured effective to:
receive user information relating to a first user;
search the social network using the user information to find additional information stored in the social network relating to the first user, wherein the additional information is different from the user information, and the additional information is inaccessible by the first user;
receive a first request to remove particular information from the social network, wherein the particular information is part of the additional information found on the social network and inaccessible by the user, the particular information is removable by a second user, and the first user does not have rights to remove the particular information from the social network;
send a second request through the social network to remove the particular information from the network to the second user, wherein the second user has the rights to remove the particular information from the social network and the second request includes a proposed modified blurred photograph or video of the first user with an image or video of the first user blurred;
request the second user to replace the particular information with the proposed modified blurred photograph or video; and
inform the first user when the second user refuses to remove the particular information.

18. The device of claim 17, wherein the search of the social network includes a search of a social network processor using the user information.

19. A non-transitory computer readable medium including instructions effective to remove information from a social network, wherein the execution of the instructions by one or more processors causes the one or more processors to:
receive user information relating to a first user;
search the social network using the user information to find additional information stored in the social network relating to the first user, wherein the additional information is different from the user information, and the additional information is inaccessible by the first user;
receive a first request to remove particular information from the social network, wherein the particular information is part of the additional information found on the social network and inaccessible by the user, the particular information is removable by a second user, and the first user does not have rights to remove the particular information from the social network;
send a second request through the social network to remove the particular information from the network to the second user, wherein the second user has the rights to remove the particular information from the social network and the second request includes a proposed modified blurred photograph or video of the first user with an image or video of the first user blurred;
request the second user to replace the particular information with the proposed modified blurred photograph or video; and
inform the first user when the second user refuses to remove the particular information.

20. The non-transitory computer readable medium of claim 19, wherein the search of the social network includes a search of a social network processor using the user information.

* * * * *